United States Patent
Qin

(10) Patent No.: US 10,470,193 B2
(45) Date of Patent: Nov. 5, 2019

(54) METHOD, APPARATUS AND SYSTEM

(71) Applicant: Nokia Solutions and Networks Oy, Espoo (FI)

(72) Inventor: Fei Feng Qin, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/313,581

(22) PCT Filed: May 28, 2014

(86) PCT No.: PCT/CN2014/078631
§ 371 (c)(1),
(2) Date: Nov. 23, 2016

(87) PCT Pub. No.: WO2015/180065
PCT Pub. Date: Dec. 3, 2015

(65) Prior Publication Data
US 2017/0196014 A1   Jul. 6, 2017

(51) Int. Cl.
*H04W 72/08* (2009.01)
*H04W 72/12* (2009.01)
*H04L 5/00* (2006.01)

(52) U.S. Cl.
CPC ......... *H04W 72/082* (2013.01); *H04L 5/0035* (2013.01); *H04L 5/0073* (2013.01); *H04W 72/085* (2013.01); *H04W 72/1231* (2013.01); *H04W 72/1284* (2013.01)

(58) Field of Classification Search
CPC .......... H04W 72/082; H04W 72/1284; H04W 72/1231; H04W 72/085; H04L 5/0073; H04L 5/0035
See application file for complete search history.

(56) References Cited

U.S. PATENT DOCUMENTS

| | | | |
|---|---|---|---|
| 2008/0232492 A1* | 9/2008 | Xiao | H04B 7/0417 375/260 |
| 2009/0154419 A1* | 6/2009 | Yoshida | H04L 5/0023 370/330 |
| 2009/0318088 A1* | 12/2009 | Wu | H04B 7/0697 455/63.4 |

(Continued)

FOREIGN PATENT DOCUMENTS

| | | |
|---|---|---|
| CN | 101636929 A | 1/2010 |
| CN | 101641894 A | 2/2010 |

(Continued)

*Primary Examiner* — Andrew Lai
*Assistant Examiner* — Harry H Kim
(74) *Attorney, Agent, or Firm* — Harrington & Smith

(57) ABSTRACT

In dependence on interference information, one or more resource block groups are allocated from a frequency carrier for use by one set of plurality multiple sets of UEs. The frequency carrier includes one or more first resource block groups to be used for a beam forming mode and one or more second resource block groups to be used for a MIMO mode. This allocating can allow decreased interference between UEs using the beam forming mode and UEs using the MIMO mode. This may be applied to UEs having different DoA groups, so that different RBGs are assigned to different DoA beam forming groups to decrease interference with UEs in MIMO mode.

20 Claims, 8 Drawing Sheets

(56) References Cited

U.S. PATENT DOCUMENTS

| | | | |
|---|---|---|---|
| 2010/0273499 A1 | 10/2010 | Van Rensburg et al. | |
| 2011/0230219 A1* | 9/2011 | Shores | H04L 5/0037 |
| | | | 455/507 |
| 2011/0305161 A1* | 12/2011 | Ekpenyong | H04L 1/0031 |
| | | | 370/252 |
| 2013/0136095 A1* | 5/2013 | Nishio | H04L 5/0007 |
| | | | 370/329 |
| 2013/0225217 A1* | 8/2013 | Li | H04W 72/082 |
| | | | 455/501 |
| 2014/0036862 A1* | 2/2014 | Lorca Hernando | |
| | | | H04W 72/1226 |
| | | | 370/330 |
| 2015/0085805 A1* | 3/2015 | Li | H04W 72/121 |
| | | | 370/329 |

FOREIGN PATENT DOCUMENTS

| CN | 102484509 A | 5/2012 |
|---|---|---|
| CN | 103081386 A | 5/2013 |
| CN | 103081550 A | 5/2013 |
| CN | 103338457 A | 10/2013 |
| CN | 103428712 A | 12/2013 |
| CN | 103458420 A | 12/2013 |

* cited by examiner

Figure 4

S14 Receiving , in a receiver, resource group allocation information, said information determined in dependence on interference information, and comprising at least one resource block group from a frequency carrier for use by said receiver, said at least one resource block being dependent on if said receiver is to use a first or a second transmission mode.

METHOD, APPARATUS AND SYSTEM

The present application relates to an apparatus, method and system and in particular but not exclusively, to MIMO (Multiple-Input and Multiple-Output) antennas.

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communications may comprise, for example, communication of data for carrying communications such as voice, electronic mail (email), text message, multimedia and/or content data and so on. Non-limiting examples of services provided include two-way or multi-way calls, data communication or multimedia services and access to a data network system, such as the Internet.

In a wireless communication system at least a part of communications between at least two stations occurs over a wireless link. Examples of wireless systems include public land mobile networks (PLMN), satellite based communication systems and different wireless local networks, for example wireless local area networks (WLAN). The wireless systems can typically be divided into cells, and are therefore often referred to as cellular systems.

A user can access the communication system by means of an appropriate communication device or terminal. A communication device of a user is often referred to as user equipment (UE). A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. An example of attempts to solve the problems associated with the increased demands for capacity is an architecture that is known as the long-term evolution (LTE) of the Universal Mobile Telecommunications System (UMTS) radio-access technology. The LTE is being standardized by the $3^{rd}$ Generation Partnership Project (3GPP). The various development stages of the 3GPP LTE specifications are referred to as releases.

In a first aspect there is provided a method comprising allocating, in dependence on interference information, at least one resource block group from a frequency carrier for use by one of a plurality of sets of user equipments, said frequency carrier comprising at least one first resource block group to be used for a first transmission mode and at least one second resource block group to be used for a second transmission mode.

The method may comprise determining the interference information in dependence on radio environment information.

The method may comprise receiving radio environment information from at least one user equipment for at least one resource block group.

Determining interference information may comprise comparing the radio environment information for resource block groups of the first transmission mode and the radio environment information for resource block groups of the second transmission mode.

The radio environment information may comprise at least one of signal to interference and noise ratio and channel quality information.

The method may comprise assigning a user equipment to one of the plurality of sets of user equipments in dependence on the direction of arrival of the user equipment The first transmission mode may be beamforming.

The second transmission mode may be multiple input-multiple output.

The method may comprise receiving frequency carrier resource block group transmission mode information from a network node.

The network node may be a base station or a radio network controller or a network management node.

The method may comprise causing transmission of resource group allocation information to a receiver. The receiver may comprise a user equipment.

The method may comprise determining resource block group requirement for at least a first set of user equipments.

The resource block group requirement may comprise a number of resource block groups of a first transmission mode and a number of resource block groups of the second transmission mode.

The method may comprise defining a first time interval and determining resource block group requirements for at least a first set of user equipments and/or receiving resource block group transmission mode information at the first time interval.

The method may comprise allocating second transmission mode resource block groups to a second transmission mode user equipment with a first priority and second mode resource block groups to a first transmission mode user equipment with a second priority, wherein the second priority is lower than the first.

The method may comprise causing transmission power information to be sent to first transmission mode user equipments allocated second transmission mode resource block groups.

The method may comprise allocating first transmission mode resource block groups to a first transmission mode user equipment with a first priority and first transmission mode resource block groups to a second transmission mode user equipment with a second priority, wherein the second priority is lower than the first.

The method may comprise allocating first transmission mode resource block groups to second transmission mode users in dependence of the set of the user equipment.

In a second aspect there is provided an apparatus comprising means for allocating, in dependence on interference information, at least one resource block group from a frequency carrier for use by one of a plurality of sets of user equipments, said frequency carrier comprising at least one first resource block group to be used for a first transmission mode and at least one second resource block group to be used for a second transmission mode.

The apparatus may comprise means for determining the interference information in dependence on radio environment information.

The apparatus may comprise means for receiving radio environment information from at least one user equipment for at least one resource block group.

The means for determining interference information may comprise means for comparing the radio environment information for resource block groups of the first transmission mode and the radio environment information for resource block groups of the second transmission mode.

The radio environment information may comprise at least one of signal to interference and noise ratio and channel quality information.

The apparatus may comprise means for assigning a user equipment to one of the plurality of sets of user equipments in dependence on the direction of arrival of the user equipment The first transmission mode may be beamforming.

The second transmission mode may be multiple input-multiple output.

The apparatus may comprise means for receiving frequency carrier resource block group transmission mode information from a network node.

The network node may be a base station or a radio network controller or a network management node.

The apparatus may comprise means for causing transmission of resource group allocation information to a receiver. The receiver may comprise a user equipment.

The apparatus may comprise means for determining resource block group requirement for at least a first set of user equipments.

The resource block group requirement may comprise a number of resource block groups of a first transmission mode and a number of resource block groups of the second transmission mode.

The apparatus may comprise means for defining a first time interval and determining resource block group requirements for at least a first set of user equipments and/or receiving resource block group transmission mode information at the first time interval.

The apparatus may comprise means for allocating second transmission mode resource block groups to a second transmission mode user equipment with a first priority and second mode resource block groups to a first transmission mode user equipment with a second priority, wherein the second priority is lower than the first.

The apparatus may comprise means for causing transmission power information to be sent to first transmission mode user equipments allocated second transmission mode resource block groups.

The apparatus may comprise means for allocating first transmission mode resource block groups to a first transmission mode user equipment with a first priority and first transmission mode resource block groups to a second transmission mode user equipment with a second priority, wherein the second priority is lower than the first.

The apparatus may comprise means for allocating first transmission mode resource block groups to second transmission mode users in dependence of the set of the user equipment.

In a third aspect there is provided an apparatus, said apparatus comprising at least one processor and at least one memory including computer code for one or more programs, the at least one memory and the computer code configured, with the at least one processor, to cause the apparatus at least to allocate, in dependence on interference information, at least one resource block group from a frequency carrier for use by one of a plurality of sets of user equipments, said frequency carrier comprising at least one first resource block group to be used for a first transmission mode and at least one second resource block group to be used for a second transmission mode.

The at least one memory and the computer code may be configured, with the at least one processor, to cause the apparatus at least to determine the interference information in dependence on radio environment information.

The at least one memory and the computer code may be configured, with the at least one processor, to cause the apparatus at least to receive radio environment information from at least one user equipment for at least one resource block group.

The at least one memory and the computer code may be configured, with the at least one processor, to cause the apparatus at least to compare the radio environment information for resource block groups of the first transmission mode and the radio environment information for resource block groups of the second transmission mode.

The radio environment information may comprise at least one of signal to interference and noise ratio and channel quality information.

The at least one memory and the computer code may be configured, with the at least one processor, to cause the apparatus at least to assign a user equipment to one of the plurality of sets of user equipments in dependence on the direction of arrival of the user equipment The first transmission mode may be beamforming.

The second transmission mode may be multiple input-multiple output.

The at least one memory and the computer code may be configured, with the at least one processor, to cause the apparatus at least to receive frequency carrier resource block group transmission mode information from a network node.

The network node may be a base station or a radio network controller or a network management node.

The at least one memory and the computer code may be configured, with the at least one processor, to cause the apparatus at least to cause transmission of resource group allocation information to a receiver. The receiver may comprise a user equipment.

The at least one memory and the computer code may be configured, with the at least one processor, to cause the apparatus at least to determine resource block group requirement for at least a first set of user equipments.

The resource block group requirement may comprise a number of resource block groups of a first transmission mode and a number of resource block groups of the second transmission mode.

The at least one memory and the computer code may be configured, with the at least one processor, to cause the apparatus at least to define a first time interval and determining resource block group requirements for at least a first set of user equipments and/or receiving resource block group transmission mode information at the first time interval.

The at least one memory and the computer code may be configured, with the at least one processor, to cause the apparatus at least to allocate second transmission mode resource block groups to a second transmission mode user equipment with a first priority and second mode resource block groups to a first transmission mode user equipment with a second priority, wherein the second priority is lower than the first.

The at least one memory and the computer code may be configured, with the at least one processor, to cause the apparatus at least to cause transmission power information to be sent to first transmission mode user equipments allocated second transmission mode resource block groups.

The at least one memory and the computer code may be configured, with the at least one processor, to cause the apparatus at least to allocate first transmission mode resource block groups to a first transmission mode user equipment with a first priority and first transmission mode resource block groups to a second transmission mode user equipment with a second priority, wherein the second priority is lower than the first.

The at least one memory and the computer code may be configured, with the at least one processor, to cause the apparatus at least to allocate first transmission mode resource block groups to second transmission mode users in dependence of the set of the user equipment.

In a fourth aspect there is provided a method comprising receiving, in a receiver, resource group allocation information, said information determined in dependence on interference information, and comprising at least one resource block group from a frequency carrier for use by said receiver, said at least one resource block being dependent on if said receiver is to use a first or a second transmission mode.

The receiver may comprise a user equipment.

The method may comprise causing radio environment information for at least one resource block group to be sent to a network node.

The radio environment information may comprise at least one of signal to interference and noise ratio and channel quality information.

The first transmission mode may be beamforming.

The second transmission mode may be multiple input-multiple output.

The receiver may belong to a set of user receivers in dependent on the direction of arrival of the receiver.

In a fifth aspect there is provided an apparatus comprising means for receiving resource group allocation information, said information determined in dependence on interference information, and comprising at least one resource block group from a frequency carrier for use by said apparatus, said at least one resource block being dependent on if said apparatus is to use a first or a second transmission mode.

The apparatus may comprise a user equipment.

The apparatus may comprise means for causing radio environment information for at least one resource block group to be sent to a network node.

The radio environment information may comprise at least one of signal to interference and noise ratio and channel quality information.

The first transmission mode may be beamforming.

The second transmission mode may be multiple input-multiple output.

The apparatus may belong to a set of apparatus in dependent on the direction of arrival of the apparatus.

In a sixth aspect there is provided an apparatus, said apparatus comprising at least one processor and at least one memory including computer code for one or more programs, the at least one memory and the computer code configured, with the at least one processor, to cause the apparatus at least to receive resource group allocation information, said information determined in dependence on interference information, and comprising at least one resource block group from a frequency carrier for use by said apparatus, said at least one resource block being dependent on if said apparatus is to use a first or a second transmission mode.

The apparatus may comprise a user equipment.

The at least one memory and the computer code may be configured, with the at least one processor, to cause the apparatus at least to cause radio environment information for at least one resource block group to be sent to a network node.

The radio environment information may comprise at least one of signal to interference and noise ratio and channel quality information.

The first transmission mode may be beamforming.

The second transmission mode may be multiple input-multiple output.

The apparatus may belong to a set of apparatus in dependent on the direction of arrival of the apparatus.

In a seventh aspect there is provided a computer program comprising computer executable instructions which when run are configured to perform the methods described above.

In an eighth aspect there is provided a computer program embodied on a computer-readable storage medium, the computer program comprising program code for controlling a process to execute a process, the process comprising the methods described above.

In all aspects, a resource block group (RBG) may be an aggregation, either consecutive or non-consecutive, of a number of resource blocks (RBs). Each of the RBs may comprise 12 frequency subcarriers within one subframe. The number of RBs in an aggregation may be configured by a network planner such as a base station or a radio network controller or a network management node.

In the above, many different embodiments have been described. It should be appreciated that further embodiments may be provided by the combination of any two or more of the embodiments described above.

FIG. 4 shows a flow chart of a method for receiving resource block scheduling information in accordance with some example embodiments;

In the following certain exemplifying embodiments are explained with reference to a wireless or mobile communication system serving mobile communication devices. Before explaining in detail the exemplifying embodiments, certain general principles of a wireless communication system and mobile communication devices are briefly explained with reference to FIGS. 1 and 2 to assist in understanding the technology underlying the described examples.

In a wireless communication system mobile communication devices or user equipment (UE) 102, 104, 105 are provided wireless access via at least one base station or similar wireless transmitting and/or receiving node or point.

Figure 1:
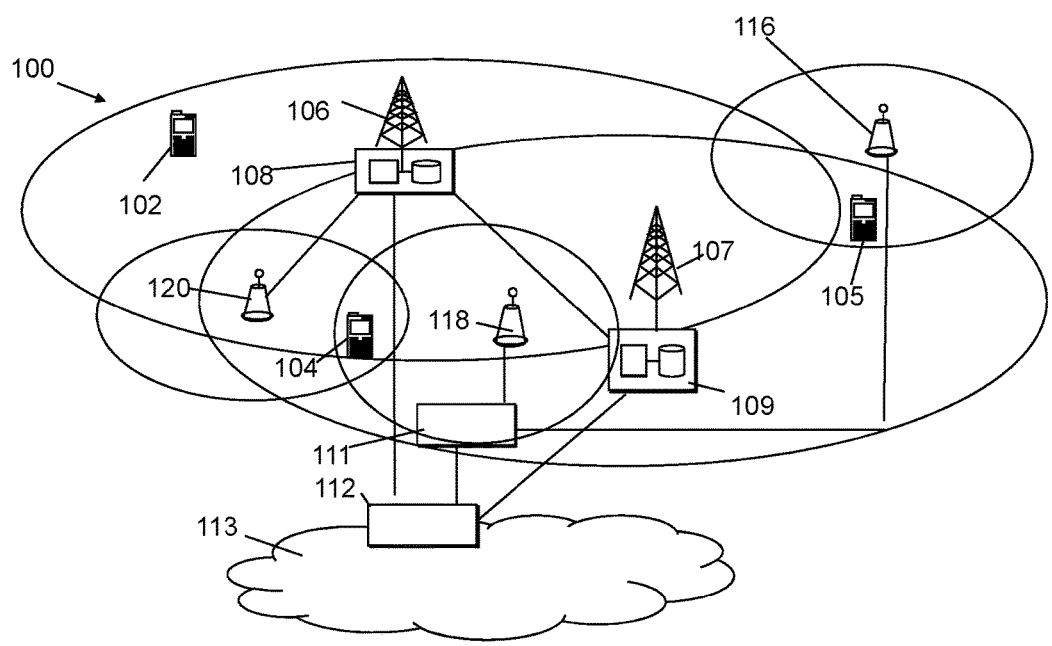
FIG. 1 shows a schematic diagram of an example communication system comprising a base station and a plurality of communication devices.

In the FIG. 1 example two overlapping access systems or radio service areas of a cellular system 100 and three smaller radio service areas provided by base stations 106, 107, 116, 118 and 120 are shown. Each mobile communication device and station may have one or more radio channels open at the same time and may send signals to and/or receive signals from more than one source. It is noted that the radio service area borders or edges are schematically shown for illustration purposes only in FIG. 1. It shall also be understood that the sizes and shapes of radio service areas may vary considerably from the shapes of FIG. 1. A base station site can provide one or more cells. A base station can also provide a plurality of sectors, for example three radio sectors, each sector providing a cell or a subarea of a cell. All sectors within a cell can be served by the same base station.

A base station may comprise at least one base band unit (BBU) which can perform system operations such as communicating with a core network. In some embodiments the base transceiver station comprises at least one RF unit (RU) or remote RF unit (RRU). The base band unit communicates with a radio frequency units (RU)/remote radio units (RRU) over a defined interface. The radio frequency unit is configured to convert base band signals into a format suitable for transmission over a wireless network. The radio frequency unit may send signals for wireless transmissions to an antenna system. The antenna system may comprise a plurality of antennas. In some embodiments the radio frequency unit is separate from the base band unit, however alternatively the radio frequency unit and the base band unit may be comprised in the same network entity. In some other embodiments the antenna system and the radio frequency unit may be comprised in the same network entity. The plurality of antennas may be used together for the purposes of beam forming wireless transmissions.

Figure 8:
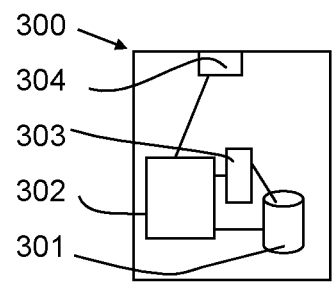
FIG. 8 shows a schematic diagram of an example control apparatus.

Base stations are typically controlled by at least one appropriate controller apparatus so as to enable operation thereof and management of mobile communication devices in communication with the base stations. In FIG. 1 control apparatus 108 and 109 is shown to control the respective macro level base stations 106 and 107. The control apparatus of a base station can be interconnected with other control entities. The control apparatus is typically provided with memory capacity and at least one data processor. The control apparatus and functions may be distributed between a plurality of control units. The control apparatus may be as shown in FIG. 8 which is discussed later.

In FIG. 1 stations 106 and 107 are shown as connected to a serving gateway (SGW) 112. The smaller stations 116, 118 and 120 are connected to a further gateway function 111 which is connected to the S-GW 112. In some embodiments, the further gateway function 111 is omitted. The S-GW 112 may be connected to, for example, the internet 113 via a PGW (PDN (packet data network) gateway).

The base stations may be connected to a MME (mobility management entity) which in turn is connected to a HSS (home subscriber server).

An example of wireless communication systems are architectures standardized by the 3rd Generation Partnership Project (3GPP). A latest 3GPP based development is often referred to as the long term evolution (LTE) of the Universal Mobile Telecommunications System (UMTS) radio-access technology. The various development stages of the 3GPP specifications are referred to as releases. More recent developments of the LTE are often referred to as LTE Advanced (LTE-A). The LTE employs a mobile architecture known as the Evolved Universal Terrestrial Radio Access Network (E-UTRAN). Base stations of such systems are known as evolved or enhanced Node Bs (eNBs) and provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 2:
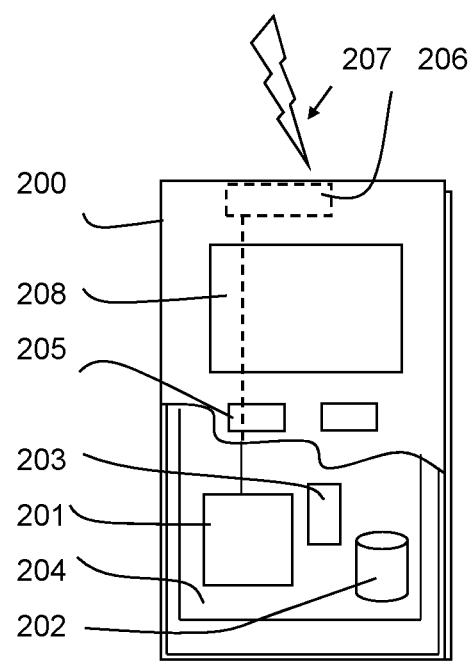
FIG. 2 shows a schematic diagram of an example mobile communication device.

A possible mobile communication device for transmitting and retransmitting information blocks towards the stations of the system will now be described in more detail with reference to FIG. 2 showing a schematic, partially sectioned view of a communication device 200. Such a communication device is often referred to as user equipment (UE) or terminal. An appropriate mobile communication device may be provided by any device capable of sending and receiving radio signals. Non-limiting examples include a mobile station (MS) such as a mobile phone or what is known as a 'smart phone', a computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. Users may also be provided broadcast or multicast data. Non-limiting examples of the content include downloads, television and radio programs, videos, advertisements, various alerts and other information. The mobile device 200 may receive signals over an air interface 207 via appropriate apparatus for receiving and may transmit signals via appropriate apparatus for transmitting radio signals. In FIG. 2 transceiver apparatus is designated schematically by block 206. The transceiver apparatus 206 may be provided for example by means of a radio part and associated antenna arrangement. The antenna arrangement may be arranged internally or externally to the mobile device.

A wireless communication device can be provided with a Multiple Input/Multiple Output (MIMO) antenna system. MIMO systems use multiple antennas at the transmitter and receiver along with advanced digital signal processing to improve link quality and capacity. Although not shown in FIGS. 1 and 2, multiple antennas can be provided, for example at base stations and mobile stations, and the transceiver apparatus 206 of FIG. 2 can provide a plurality of antenna ports. More data can be received and/or sent where there are more antenna elements. A station may comprise an array of multiple antennas. Signalling and muting patterns can be associated with transmitter antenna numbers or receiver port numbers of MIMO arrangements.

A mobile device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204. The user may control the operation of the mobile device by means of a suitable user interface such as key pad 205, voice commands, touch sensitive screen or pad, combinations thereof or the like. A display 208, a speaker and a microphone can be also provided. Furthermore, a mobile communication device may comprise appropriate connectors (either wired or wireless) to other devices and/or for connecting external accessories, for example hands-free equipment, thereto.

Beamforming is a technology which may be used to strengthen the antenna gain in the direction of a user and increase the signal power level, which may be beneficial for downlink performance. Some users, who may have a weak radio situation, may be assigned to use beamforming as their transmission mode. Other users, who may have a superior radio situation or common information transmission requirement, will be assigned to use MIMO as their transmission mode. The assignment process can be implemented by a network node (e.g. eNodeB), for example, by considering the radio quality situation and traffic requirement of the users. Thus, there may be mixed transmission modes assigned in TDD LTE cells.

Figure 6:
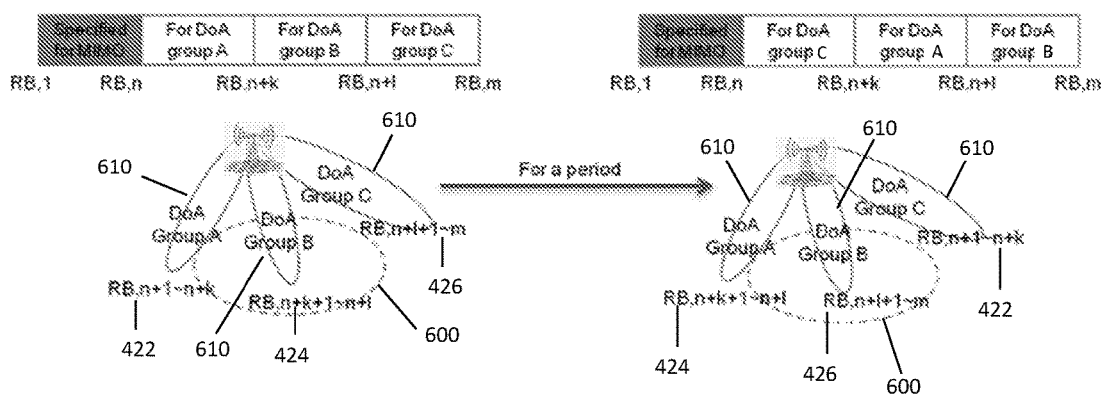
FIG. 6 shows a schematic diagram of a dynamic telecommunications system including DoA groups in accordance with some example embodiments.
Figure 7:
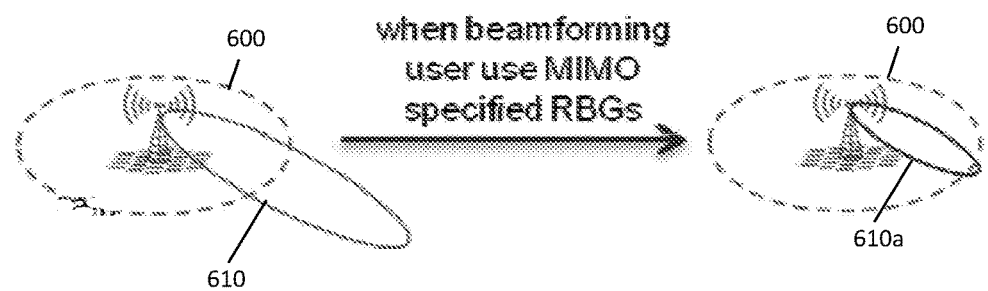
FIG. 7 shows a schematic diagram of a telecommunications system and extent of a beam in accordance with some example embodiments.

Instead of the fixed antenna pattern of a sector beam 600 used for MIMO transmission mode as shown in FIGS. 6 and 7, beamforming produces a specified major beam 610, as shown in FIGS. 6 and 7, with higher gain than sector beam 600 for a UE, based on sounding signal measurement of the UE. Antenna patterns may be changed according to the UE's radio situation at the RBGs (Resource Block Groups) allocated to the UE and may be different to a sector beam 600 which is used by MIMO users.

An RBG may be defined as the aggregation, either consecutive or not, of a number of RBs (Resource Blocks). Each of the RBs may comprise 12 frequency subcarriers within one subframe. The number of RBs in an aggregation could be configured by a network planner such as a base station or a radio network controller or a network management node. A physical resource block may be defined as 7 (for normal CP (Cyclic Prefix)) or 6 (for extended CP) consecutive Single Carrier Frequency Division Multiple Access (SC-FDMA) symbols in the time domain and 12 consecutive subcarriers in the frequency domain.

In general frequency domain scheduling solutions, a network node (e.g. eNodeB) may consider users' SINR at each RBG (resource block group) among the whole frequency carrier and select the best RBGs for the users' PDSCH transmission. Thus, there may be mixed transmission modes scattering throughout each subcarrier of an LTE network. Cells may not be aware of which transmission mode occupies which RBGs in neighbouring cells.

Mixed transmission mode may cause unpredictable interference problem between neighbour cells. When a MIMO UE is transmitting, beamforming interference due to higher gain of a major beam from a neighbour cell may be unavoidable. This may affect the SINR and result in higher BLER (Block Error Rate) for PDSCH and a decrease in KPI (key performance indicator).

The allocation of RBGs used for a beamforming UE may change frequently in different timeslots and neighbour cells may not be able to predict the interference situation of these RBGs. A higher margin may be considered, a lower code rate may be assigned and the result may be throughput decreasing.

Traditional scheduler methods do not take theses impacts into account.

Figure 3:
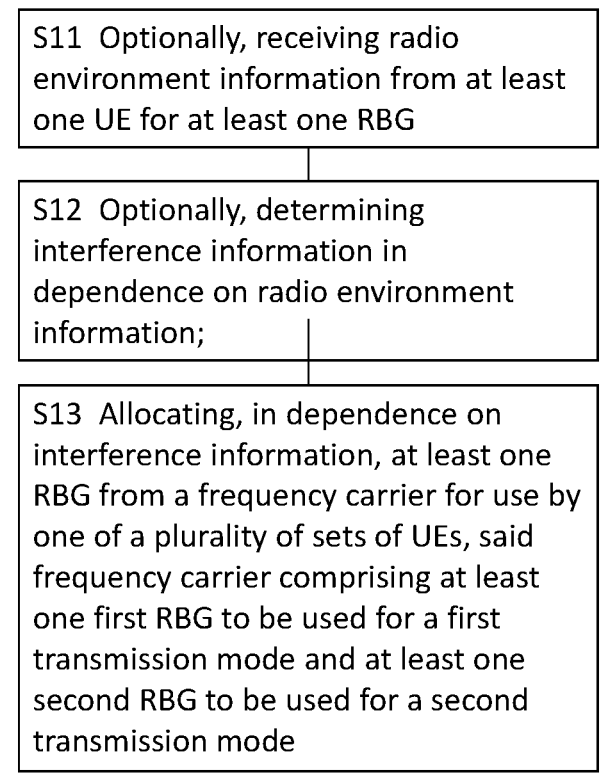
FIG. 3 shows a flow chart of a method for scheduling resource blocks in accordance with some example embodiments.

FIG. 3 shows a flow chart of a scheduling method to make beamforming interference controllable and predictable, for example in TDD LTE networks, in accordance with some embodiments of the invention. The method may be performed at a network node such as a eNB. In step S13, the method comprises allocating, in dependence on interference information, at least one RBG from a frequency carrier for use by one of a plurality of sets of UEs, said frequency carrier comprising at least one first RBG to be used for a first transmission mode and at least one second RBG to be used for a second transmission mode. In step S12, the interference information may be determined in dependence of radio environment information. In step S11, radio environment information for at least one RBG may be received from a UE. The method may further comprise causing transmission of resource group allocation information to a user equipment.

A method in accordance with some embodiments is described as being performed by a network node (e.g. an eNB). The method may be carried out by a smaller apparatus within and/or external to the network node, for example a processor and/or control apparatus as described in relation to FIG. 8.

FIG. 4 shows a flow chart of a method to be performed at a receiver in accordance with some embodiments of the invention. The receiver may be a UE or part of a UE (e.g. modem). In step S14, the receiver may receive resource group allocation information, said information determined in dependence on interference information, and comprising at least one resource block group from a frequency carrier for use by said receiver, said at least one resource block being dependent on if said receiver is to use a first or a second transmission mode. A method in accordance with some embodiments is described as being performed by a UE. The method may be carried out by a smaller apparatus within and/or external to a UE, for example a processor and/or control apparatus as described in relation to FIG. 8.

Figure 5A:
FIG. 5a shows a schematic diagram of a frequency carrier in accordance with some example embodiments.
Figure 5B:
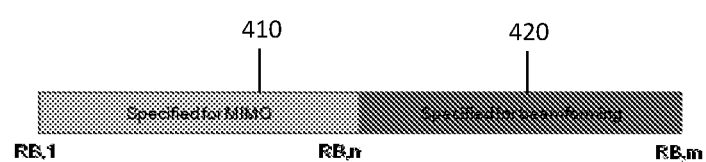
FIG. 5b shows a schematic diagram of a partitioned frequency carrier in accordance with some example embodiments.

FIG. 5a shows the RBG resources (RB,1-RB,m) of a frequency carrier 400 of LTE. As shown in FIG. 5b, the RBGs of a frequency carrier may be split into a first part 410 and a second part 420 in accordance with some embodiments of the invention. The first part may comprises RBGs RB,1 to Rb,n and the second part may comprise RB,n+1 to RB,m. The RBGs of a frequency carrier 400 may be split into parts 410 and 420 equal in size as shown in FIG. 5a. Alternatively, the RBGs may be split into parts unequal in size. The first part 410 may be specified for MIMO users and the second part 420 for beamforming users. The partition configuration may be the same between different cells (e.g. TDD LTE cells) and/or may be fixed for a long-term period. A network planner (e.g. a base station or a radio network controller or a network management node) may predict the ratio of MIMO and beamforming users and decide how many RBGs should be specified for MIMO or beamforming. The network planner may trace the ratio of MIMO and beamforming users. If there is a large change after a long term period, the network planner may re-configure a new partition.

The neighbour cells of the network (e.g. TDD LTE network) may use the same partition configuration in an initial phase or during network reconfiguring.

A network node (e.g. eNodeB) may group all the users distributed over a cell (e.g. TDD LTE cell) into several DoA (Direction of Arrival) groups based on their DoA. An eNodeB may determine the RBG requirement of each DoA group and define the expected amount of RBG loading.

Figure 5C:
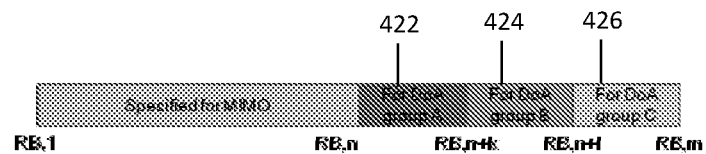
FIG. 5c shows a schematic diagram of a partitioned frequency carrier in accordance with some example embodiments.

FIG. 5c shows RBG resources portioned into DoA (direction of arrival) groups 422, 424 and 426 in accordance with some embodiments of the invention. Beamforming specific RBGs are allocated separately for each DoA group. The groups 422, 424 and 426 into which the RBG resources are split may be equal in size as shown in FIG. 5c. Alternatively the groups of RBGs may be unequal. Although three groups of RBGs, 422, 424 and 426, are shown in FIG. 5c, the number of groups may vary. For beamforming specified RBGs, a network node (e.g. eNodeB) may use users' DoA to search corresponding bundled RBGs. Beamforming users may have a higher priority to select and use these RBGs. If there are beamforming specified RBGs remaining, they may be allocated to other MIMO users which are located in corresponding bundled DoA groups.

FIG. 6 shows three DoA groups, A, B and C. As an example, DoA group A may comprise UEs with a DoA of −60 degree to −20 degree offset to sector's 0 angle, DoA group B may comprise UEs with a DoA of −20 degree to +20 degree offset to sector's 0 angle and/or DoA group C comprising +20 degree to +60 degree offset to sector's 0 angle.

Each user may measure and report its radio quality for each RBG of the frequency carrier 400 to a network node (e.g. eNB) for example, in terms of radio environment information such as signal to interference plus noise ratio (SINR) or Channel Quality Indicator (CQI). The network node (e.g. eNodeB) may compare the radio environment information indicative of the radio quality between MIMO specified RBGs and beamforming specified RBGs and analyse the interference situation from neighbour cells of each beamforming specified RBG. For example, the eNodeB may subtract the average SINR of MIMO-specified RBGs and the SINR of each beamforming specified RBG in dB value. The result could reflect the interference level of each beamforming specified RBGs.

The eNB may allocate beamforming specified RBGs separately for each DoA groups as shown in FIG. 5c, taking into account one or more of the RBG requirement of each DoA group, the expected loading of the RBG, the radio quality reported by the user and the determined interference situation. Those DoA groups with higher requirement for RBGs may be allocated more RBGs, but, among those, RBGs with higher interference level may be excluded by the bundled RBGs for that DoA group. The eNB may then build a bundling relationship between beamforming RBGs and DoA groups.

This method may lower the risk of interference between beamforming and MIMO users and then increase KPI performance. Interference of a major beam of beamforming with a neighbour MIMO user may be avoided due to RBG partition for MIMO and beamforming UE. A MIMO user may use a sector beam 600 in MIMO specified RBGs to ensure predictable radio conditions, which will be helpful for efficient AMC (adaptive modulation and coding) function. Adaptive re-bundling process could coordinate the major beam 610 and sidelobe of neighbor beamforming users and then decrease interference for each other.

A network node (e.g. eNB) may define a configurable timer. The timer may be used to trigger the change in expected loading and bundled RBGs of each DoA group after a long period. User specified beamforming pattern of each DoA-bundled RBG may be kept constant in this period, which makes the radio channel of these subcarriers flat and easy to predict.

As shown in FIG. 6, the bundling relationship between DoA and beamforming specified RBGs may be dynamically adjusted according to interference situation, represented by the sector beam 600. The resource block group 422 (e.g. RB from index n+1 to n+k) which was originally assigned to a first DoA group, for example DoA group A comprising −60 degree to −20 degree offset to sector's 0 angle, may be assigned to another DoA group, for example DoA group C comprising +20 degree to +60 degree offset to sector's 0 angle. In the example shown in FIG. 6, the resource block group 426 (e.g. RB from index n+l+1 to m) originally assigned to DoA group C may be assigned to DoA group B comprising −20 degree to +20 degree offset to sector's 0 angle and the resource block group 424 (e.g. RB from index n+k+1 to n+l) of DOA group B may be assigned to DoA group A. Other suitable adjustments may be made depending on the interference experienced. The adjustment process may be triggered by a long-term timer.

For MIMO specified RBGs, users could use a frequency selection method to search and select RBGs. MIMO users may have higher priorities to use these RBGs. If there are MIMO specified RBGs remaining after MIMO users' selection, the MIMO specified RBGs may be allocated to beamforming users. In this case the beamforming users' downlink may control their transmission power via limiting their beamforming gain to a similar level of the sector beam 600.

FIG. 7 shows a sector beam 600, the extent of which indicated by the dashed line compared to the extent of a main beam 610 used in beamforming. MIMO users have the higher priority to be allocated MIMO specified RBGs by an eNodeB through normal scheduling method. If some MIMO RBGs remain available, beamforming users have the opportunity to use the MIMO RBGs. The network node (e.g. eNodeB) may control the transmission power and reduce the beamforming gain of the main beam 610a of these users down to the similar level of sector beam 600 as shown in FIG. 7. Controlling the transmission power of a beamforming user using MIMO RBGs may limit interference to MIMO user of neighbour cells.

Beamforming users have the higher priority to be allocated beamforming specified RBGs by eNodeB among those RBGs bundled with their DoA groups. When there is some beamforming RBGs remaining available, an eNodeB may allocate them to those MIMO users whose positions are located in the bundled DoA group. A MIMO user using beamforming RBGs bundled with its DoA could limit interference to neighbour cells due to the constant gain of the sector beam.

Methods described herein may be implemented on a control apparatus as shown in FIG. 8. FIG. 8 shows an example of a control apparatus for a communication system, for example to be coupled to and/or for controlling a station of an access system, such as a base station or (e) node B, or a server or host, or to be coupled to or controlling a UE. In some embodiments, base stations comprise a separate control apparatus, unit or module. In other embodiments, the control apparatus can be another network element such as a radio network controller. The control apparatus can be an apparatus via which the operator can manage the network configurations, e.g. NetAct OSS. In some embodiments, each base station may have such a control apparatus as well as a control apparatus being provided in a radio network controller. The control apparatus 300 can be arranged to provide control on communications in the service area of the system. The control apparatus 300 comprises at least one memory 301 and at least one data processing unit 302, 303 and may also comprise an input/output interface 304. Via the interface the control apparatus can be coupled to a receiver and a transmitter of the base station. The receiver and/or the transmitter may be implemented as a radio front end or a remote radio head. For example the control apparatus 300 can be configured to execute an appropriate software code to provide the control functions. It should be understood that the control apparatuses may include or be coupled to other units or modules such as radio parts or radio heads, used in or for transmission and/or reception. Although the apparatuses have been depicted as one entity in FIG. 8, different modules and memory may be implemented in one or more physical or logical entities.

It is noted that whilst embodiments have been described in relation to LTE, and in particular to TDD LTE, similar principles can be applied to any other communication system, such as 3G, LTE-A, WLAN or WiMax, where a plurality of transmission modes are supported. The communication system may be any TDD system. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they include program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), FPGA, gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more embodiments with any of the other embodiments previously discussed.

The invention claimed is:

1. A method comprising:
allocating, by a network node, at least one resource block group from at least one first resource block group on a frequency carrier used for a beam forming mode and at least one second resource block group on the frequency carrier used for a multiple-input/multiple-output mode, the allocating in dependence on at least interference information for the first and second resource block groups and in dependence on determining resource block group requirement for at least a first set of a plurality of sets of user equipments, wherein the resource block group requirement comprises a number of resource block groups of the beam forming mode and a number of resource block groups of the multiple-input/multiple-output mode, wherein the allocating allocates the at least one resource block group for use by the first set user equipments; and
communicating between the network node and the user equipments in the first set of user equipments on the allocated at least one resource block group.

2. The method according to claim 1, comprising determining the interference information in dependence on radio environment information and receiving the radio environment information from at least one user equipment for at least one resource block group, wherein the radio environment information comprises at least one of signal to interference and noise ratio or channel quality information.

3. The method according to claim 2, wherein determining interference information comprises comparing the radio environment information for resource block groups of the beam forming mode to the radio environment information for resource block groups of the multiple-input/multiple-output mode.

4. The method according to claim 1, comprising assigning a user equipment to one of the plurality of sets of user equipments in dependence on a direction of arrival of the user equipment.

5. The method of claim 4, wherein the allocating further comprises allocating different sets of resource block groups for the beam forming mode to different directions of arrivals for user equipments, based on interference for the different sets of resource block groups in order to decrease interference between the different resource block groups for the beam forming mode and resource block groups for the multiple-input/multiple-output mode.

6. The method according to claim 1, comprising receiving frequency carrier resource block group transmission mode information from an other network node.

7. The method according to claim 6, wherein the other network node is a base station or a radio network controller or a network management node.

8. The method according to claim 1, comprising causing transmission of resource group allocation information to a user equipment.

9. The method according to claim 1, comprising allocating second transmission mode resource block groups to a multiple-input/multiple-output mode user equipment with a first priority and second mode resource block groups to a beam forming mode user equipment with a second priority, wherein the second priority is lower than the first.

10. The method according to claim 9, comprising causing transmission power information to be sent to beam forming mode user equipments allocated multiple-input/multiple-output mode resource block groups.

11. The method according to claim 1, comprising allocating first transmission mode resource block groups to a beam forming mode user equipment with a first priority and first transmission mode resource block groups to a multiple-input/multiple-output mode user equipment with a second priority, wherein the second priority is lower than the first.

12. The method according to claim 11 comprising allocating first transmission mode resource block groups to multiple-input/multiple-output mode users in dependence of the first set of the user equipment.

13. An apparatus comprising:
at least one processor; and
at least one non-transitory memory including computer program code, the at least one memory and the computer program code configured to, with the at least one processor, cause the apparatus at least to perform:
allocating, by a network node, at least one resource block group from at least one first resource block group on a frequency carrier for a beam forming mode and at least one second resource block group on the frequency carrier used for a multiple-input/multiple-output mode, the allocating in dependence on at least interference information for the first and second resource block groups and in dependence on determining resource block group requirement for at least a first set of a plurality of sets of user equipments, wherein the resource block group requirement comprises a number of resource block groups of the beam forming mode and a number of resource block groups of the multiple-input/multiple-output mode, wherein the allocating allocates the at least one resource block group for use by the first set of user equipments; and
communicating between the network node and the user equipments in the first set of user equipments on the allocated at least one resource block group.

14. The apparatus according to claim 13, wherein the at least one memory and the computer program code are further configured to, with the at least one processor, cause the apparatus at least to perform: determining the interference information in dependence on radio environment information and receiving the radio environment information from at least one user equipment for at least one resource block group, wherein the radio environment information comprises at least one of signal to interference and noise ratio or channel quality information.

15. The apparatus according to claim 13, wherein the at least one memory and the computer program code are further configured to, with the at least one processor, cause the apparatus at least to perform: assigning a user equipment to one of the plurality of sets of user equipments in dependence on a direction of arrival of the user equipment, and wherein the allocating further comprises allocating different sets of resource block groups for the beam forming mode to different directions of arrivals for user equipments, based on interference for the different sets of resource block groups in order to decrease interference between the different resource block groups for the beam forming mode and resource block groups for the multiple-input/multiple-output mode.

16. The apparatus according to claim 13, wherein the at least one memory and the computer program code are further configured to, with the at least one processor, cause the apparatus at least to perform: receiving frequency carrier resource block group transmission mode information from an other network node, wherein the other network node is a base station or a radio network controller or a network management node.

17. The apparatus according to claim 13, wherein the at least one memory and the computer program code are further configured to, with the at least one processor, cause the apparatus at least to perform: allocating second transmission mode resource block groups to a multiple-input/multiple-output mode user equipment with a first priority and second mode resource block groups to a beam forming mode user equipment with a second priority, wherein the second priority is lower than the first.

18. The apparatus according to claim 13, wherein the at least one memory and the computer program code are further configured to, with the at least one processor, cause the apparatus at least to perform: causing transmission power information to be sent to beam forming mode user equipments allocated multiple-input/multiple-output mode resource block groups.

19. The apparatus according to claim 13, wherein the at least one memory and the computer program code are further configured to, with the at least one processor, cause the apparatus at least to perform: allocating first transmission mode resource block groups to a beam forming mode user equipment with a first priority and first transmission mode resource block groups to a multiple-input/multiple-output mode user equipment with a second priority, wherein the second priority is lower than the first.

20. A computer program product comprising a non-transitory computer-readable medium having program instructions thereon, the program instructions causing an apparatus to perform the following when the program instructions are executed by the apparatus:
allocating, by a network node, at least one resource block group from at least one first resource block group on a frequency carrier used for a beam forming mode and at least one second resource block group on the frequency carrier used for a multiple-input/multiple-output mode, the allocating in dependence on at least interference information for the first and second resource block groups and in dependence on determining resource block group requirement for at least a first set of a plurality of sets of user equipments, wherein the resource block group requirement comprises a number of resource block groups of the beam forming mode and a number of resource block groups of the multiple-input/multiple-output mode, wherein the allocating allocates the at least one resource block group for use by the first set of user equipments; and communicating between the network node and the user equipments in the first set of user equipments on the allocated at least one resource block group.

* * * * *